March 31, 1925. 1,531,588
J. M. WILLIAMS, JR
AIRCRAFT LANDING GEAR
Filed April 11. 1923 2 Sheets-Sheet 1
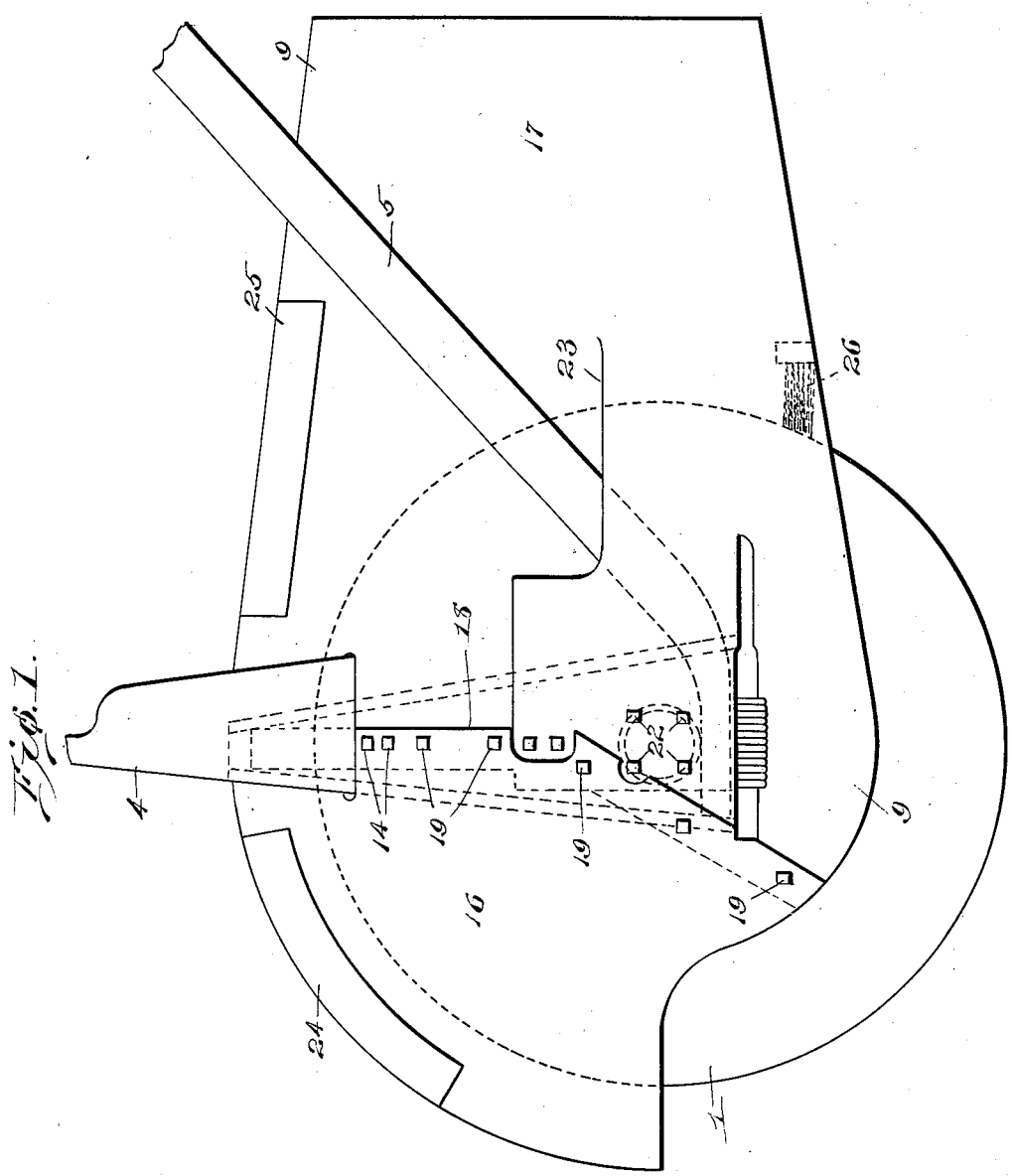
Inventor
John M. Williams Jr.,
By Robert H. Young.
Attorney March 31, 1925.
J. M. WILLIAMS, JR
1,531,588
AIRCRAFT LANDING GEAR
Filed April 11, 1923
2 Sheets-Sheet 2
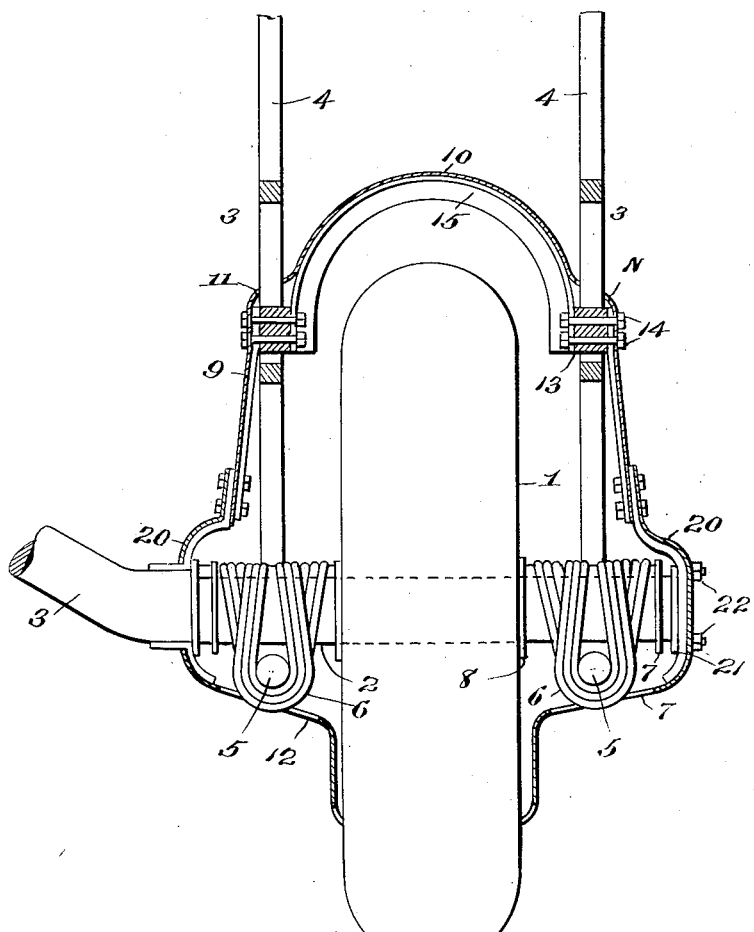
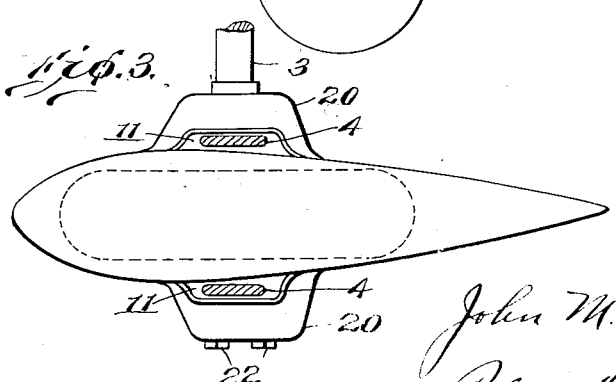
Inventor
John M. Williams Jr.
By Robert H. Young
Attorney Patented Mar. 31, 1925.

1,531,588

UNITED STATES PATENT OFFICE.

JOHN M. WILLIAMS, JR., OF MONTCLAIR, NEW JERSEY.

AIRCRAFT LANDING GEAR.

Application filed April 11, 1923. Serial No. 631,337.

*To all whom it may concern:*

Be it known that I, JOHN M. WILLIAMS, Jr., a citizen of the United States, residing at 135 Montclair Ave., Montclair, in the county of Essex and State of New Jersey, have invented certain new and useful Improvements in Aircraft Landing Gears, of which the following is a specification.

This invention relates to aircraft landing gear. The invention has for its objects to produce a simple, effective and practical landing gear for the purpose stated which combines strength to a high degree, lightness and flexibility or shock absorbing properties, the landing gear also embodying a streamlined housing which incloses the major portion of the wheel, all of the axle and shock absorbing means and a considerable portion of the frame members which connect the axle of the wheel with the craft. In this manner the head resistance of the greater portion of the landing gear is materially reduced and the efficiency of the aircraft in conjunction with which the landing gear is used is added to.

With the above and other objects in view the invention consists in the novel construction, combination and arrangement herein fully described, illustrated and claimed.

In the accompanying drawings—

Figure 1 is a side elevation illustrating the improved landing gear;

Figure 2 is a vertical transverse sectional view of the same taken adjacent to the axle;

Figure 3 is a horizontal section through the axle, showing the streamlined housing in top plan view.

In the drawings 1 designates a landing wheel of any suitable size and construction and 2 the axle on which said wheel is mounted. The axle 2 is ordinarily nonrotary and may be provided with an extension 3 leading upwardly to the body of the aircraft.

In the illustrated embodiment of the invention I have shown a pair of axle-carrying frame members 4 arranged at opposite sides of the wheel 1 and extending in substantially vertical planes. 5 represents a pair of axle bracing frame members which extend upwardly to the body of the craft and downwardly and forwardly where they pass under and transversely of the axle 2, as indicated in Figures 1 and 2. The members 5 are fastened securely to the lower extremities of the frame members 4 and shock absorbing means connect the frame members with the axle 2, as best shown in Figure 2, said shock absorbing means being shown as consisting of elastic cords or ropes 6 which are reeved around the axle and the under axle portions of the frame members 5, the cords or rope passing under the members 5 and over the axle 2, as clearly illustrated. The cords or ropes 6 are also confined between collars 7 and 8 on the axle 2.

In closing the major portion of the wheel 1, all of the axle 2, all of the shock absorbing means 6, and considerable portions of the frame members 4 and 5, is a streamlined housing 9. The streamlining of this housing is best illustrated in Figures 1 and 3 and said housing is movable bodily with the axle 2 and the wheel 1, the latter being free to rotate within the housing. The housing comprises an arched top portion 10, as shown in Figure 2, and the side walls of the housing are formed with upper apertures 11 through which the frame members 4 are freely movable, and also with lower apertures 12 of larger size to admit of the upward and downward movements of the shock absorbing means, as illustrated in said Figure 2. At the junction of the arched top wall 10 and side walls of the housing are offsets where the apertures 11 are formed and blocks or guides 13 are secured to the side walls of the housing by bolts 14, or the equivalent thereof. The whole structure is further and materially braced by means of an arched and flanged or angle iron yoke 15 clearly shown in Figure 2, said yoke being fastened to the guides 13 by the bolts 14 referred to. The frame members 4 are formed, as shown, to embrace the guides 13 so that said guides direct the upward and downward movements of the axle-carrying frame members 4.

Additionally the streamlined housing is formed in a forward section 16 and a rear section 17, as shown in Figure 1, said sections being overlapped along the line 18 and secured firmly together by suitable fastening means 19. The housing is also formed with other small offsets or bulging portions 20 through one of which the axle 2 passes, the extremity of the axle resting in the other offset 20 and having an end flange 21 carrying bolts which extend through the offset portion 20 of the housing and are secured by nuts 22 or the equivalent thereof. The housing is thus secured fixedly to the extremity of the axle 2 and moves at all times bodily with the axle. The frame memers 4 being flexibly connected to the axle are adaptable of upward and downward movements. In addition to the apertures 11 and 12 in the housing 9, the latter is formed with other apertures 23 through which the axle bracing frame members 5 pass, as best shown in Figure 1. The housing 9 is shown as provided along the upper portion thereof with one or more movable sections 24 and 25 for inspection and wheel cleaning purposes. A scraper or brush 26 is shown arranged within the housing so as to bear against the rear portion of the wheel 1 to keep the latter free from all adhering matter.

I claim—

1. In combination with an aircraft landing gear wheel, an axle on which said wheel is mounted, a frame member connected flexibly with said axle for upward and downward movement in relation to the axle and wheel, and a wheel housing of streamline formation movable bodily with said axle and apertured to receive said frame member and admit of such movement thereof.

2. In combination with an aircraft landing gear wheel, an axle on which said wheel is mounted, a wheel housing of streamline formation movable bodily with said axle, a frame member movable upwardly and downwardly through the wall of said housing, and shock-absorbing means between said frame member and axle and inclosed by said housing.

3. In combination with an aircraft landing gear wheel, an axle on which said wheel is mounted, a wheel housing of streamline formation movable bodily with said axle, and a frame member movable upwardly and downwardly through the wall of said housing and flexibly connected inside of said housing with the axle.

4. In combination with an aircraft landing gear wheel, an axle on which said wheel is mounted, a frame member connected flexibly with said axle for upward and downward movement in relation to the axle and wheel, and a wheel housing of streamline formation movable bodily with said axle and apertured to receive said frame member and admit such movement thereof, said housing having guiding means for directing such movement of said frame member.

5. In combination with an aircraft landing gear wheel, an axle on which said wheel is mounted, an axle-carrying frame member flexibly connected with said axle for upward and downward movement in relation to the axle and wheel, an axle-bracing frame member also flexibly connected with said axle for upward and downward movement in relation to the axle and wheel, and a wheel housing of streamline formation movable bodily with said axle and apertured to receive said frame members and admit of such movements thereof.

6. In combination with an aircraft landing gear wheel, an axle on which said wheel is mounted, a wheel housing of streamline formation movable upwardly and downwardly through the wall of said housing and extending under said axle in a direction transverse to the axle, and shock-absorbing means between said frame member and axle and inclosed by said housing.

7. In combination with an aircraft landing gear wheel, an axle on which said wheel is mounted, an axle-carrying frame member, an axle-bracing frame member extending at one end under the axle transversely thereof and fastened to the axle-carrying member, shock-absorbing means connecting the under axle portion of said frame member with the axle, and a wheel housing of streamline formation movable bodily with said axle, inclosing said shock-absorbing means and apertured to receive said frame members and admit of the upward and downward movement of said members in relation to the axle.

8. In combination with an aircraft landing gear wheel, an axle on which said wheel is mounted, axle-carrying frame members at opposite sides of said wheel, a wheel housing of streamline formation movable bodily with said axle and apertured to receive said frame members and admit of upward and downward movement thereof, and shock-absorbing means between said axle and frame members and inclosed by said housing.

9. In combination with an aircraft landing gear wheel, an axle on which said wheel is mounted, axle-carrying frame members at opposite sides of said wheel, a wheel housing of streamline formation movable bodily with said axle and apertured to receive said frame members and admit of upward and downward movement thereof, guides for directing the movements of the frame members in relation to the housing, a yoke connecting said guides, and shock-absorbing means between said axle and frame members and inclosed by said housing.

In testimony whereof I affix my signature.

JOHN M. WILLIAMS, Jr.